N. L. ANTHONY.
EGG OPENER.
APPLICATION FILED APR. 5, 1913.
1,097,283.
Patented May 19, 1914.
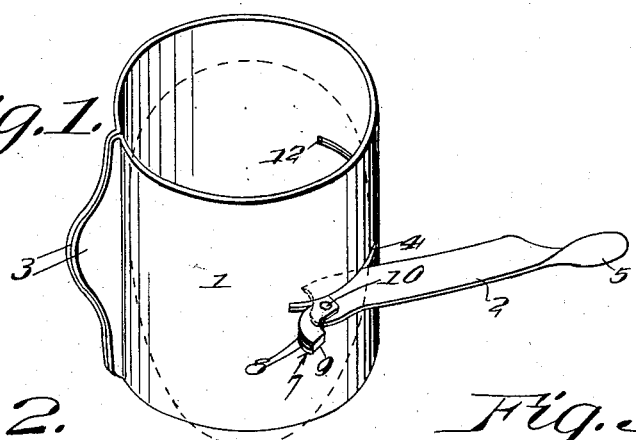
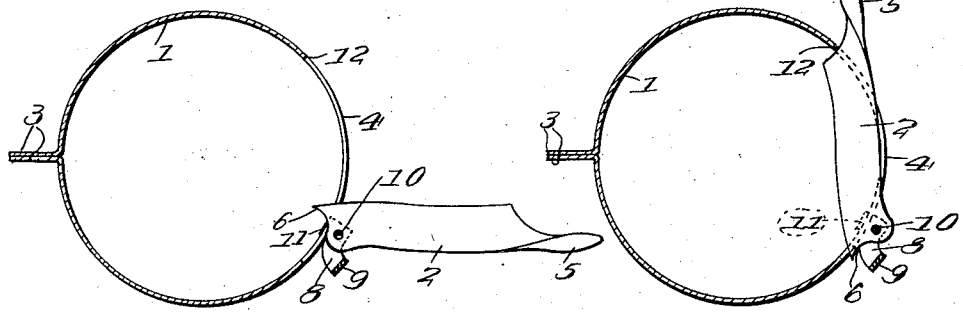
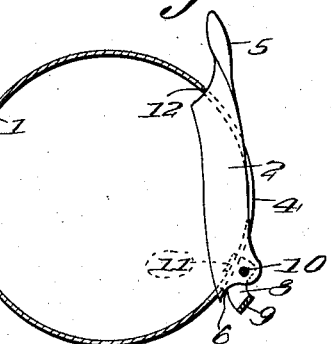
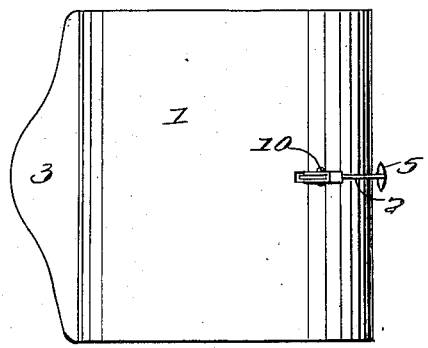

UNITED STATES PATENT OFFICE.

NOEL L. ANTHONY, OF CRANSTON, RHODE ISLAND.

EGG-OPENER.

1,097,283. Specification of Letters Patent. Patented May 19, 1914.

Application filed April 5, 1913. Serial No. 759,188.

*To all whom it may concern:*

Be it known that I, NOEL L. ANTHONY, a citizen of the United States, residing at Cranston, in the county of Providence and State of Rhode Island, have invented a new and useful Improvement in Egg-Openers, of which the following is a specification.

This invention relates to certain new and useful improvements in egg openers, and the primary object of the invention is to provide means for positively effecting cutting of the egg in two parts, by first penetrating the shell to allow the cutter to enter and complete the cutting action.

Further, the invention aims to provide an improved structure of simple and economical construction, which will cut the egg easily and quickly.

In the drawings: Figure 1 is a perspective view of the invention. Fig. 2 is a transverse section, showing the cutting knife at the inception of its cutting movement. Fig. 3 is a similar view showing the cutting knife at the completion of its cutting movement. Fig. 4 is a side elevation, and Fig. 5 is an enlarged front end elevation of the member that pivotally connects the knife and body.

The invention consists of but two members, namely a body 1 and a cutting knife 2. The body is of tubular form, and is preferably constructed of a sheet of spring metal, that is bent into tubular form and is provided at its meeting portions with outturned ears 3 that provide finger engaging parts. As shown in the drawings, the ears are in engagement with each other, in which position they are held by the fingers of the operator, in order that the body will clamp the egg on the interior thereof to positively hold same during the cutting action, and upon completion of the cutting of the egg, the ears are released which allows the body, due to the spring property of the metal of which it is constructed, to spring open, thus permitting the egg to be easily removed.

The body 1 is formed with a slot 4 in which the cutting knife operates, the latter having a handle portion 5 at its free end and a curved heel 6 at its inner end, the latter being pointed so as to easily enter the egg shell. The cutting blade is pivoted to the body by means of a member 7, which latter is formed of a sheet metal blank that is bent to have parallel spaced sides 8 connected at their tops by means of a cross piece 9, the cutting knife being pivoted by means of a pin or rivet 10 in the space between said sides 8. The sides extend through the slot 4, and their lower ends are turned outwardly away from each other at 11 in order to provide feet which are suitably and rigidly secured to the inner circumference of the body on opposite sides of the slot 4. The cross piece 9 acts to engage the rear side of the cutting knife to thereby restrict the outward movement thereof, the end wall 12 formed by the slot 4 acting to similarly limit the cutting movement of the knife.

In operation, the egg is placed in the body and the latter is then caused to clamp the egg, whereupon the knife is moved from the position shown in Fig. 2 to that depicted in Fig. 3. Due to the location of the cutting heel of the knife it will be seen that great purchase is obtained to force the point through the egg shell after which the blade will readily enter to complete the cutting action.

Having thus described my invention, I claim as new and desire to secure by Letters Patent:—

1. In an egg opener, a tubular body having a transverse slot, a member having spaced parallel sides that extend through the slot, the inner ends of said sides being turned outwardly and secured to the inner circumference of the body, the outer ends of the sides being connected by a crosspiece, a cutting knife pivoted in the space between said sides and being for engagement with the cross piece.

2. In an egg opener, a resilient tubular body having normally separated opposed finger engaging portions by means of which said finger engaging portions may be manually brought together so as to clamp an egg on the interior of the body, and egg cutting means borne by the body.

3. In an egg opener, an egg receiving member having an arcual slot, a U-shaped element having outturned feet secured to said body at one end of the slot, and a knife pivoted between the legs of said element, said knife having its movements limited by said element and the wall formed by the opposite end of the slot.

4. In combination with an egg holder, a knife, a pointed heel which projects considerably beyond the inner end of the knife, and means to pivot the knife to the holder whereby when the knife is moved to cutting position the heel will penetrate the egg prior to the commencement of the cutting action of the knife, the pivotal point being located at a distance to the rear of the heel.

In testimony whereof I have signed my name to this specification in the presence of two subscribing witnesses.

NOEL L. ANTHONY.

Witnesses:
ADA E. HAGERTY,
J. A. MILLER.